US006621783B1

United States Patent
Murata

(10) Patent No.: US 6,621,783 B1
(45) Date of Patent: Sep. 16, 2003

(54) METHODS OF RETRIEVING INFORMATION FROM OPTICAL DISK AND CONTROLLING ACCESS AND RECORDING TO OPTICAL DISK, AND OPTICAL DISK RECORDING APPARATUS

(75) Inventor: Morihiro Murata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/536,388

(22) Filed: Mar. 28, 2000

(30) Foreign Application Priority Data

Mar. 29, 1999 (JP) .......................................... 11-086414

(51) Int. Cl.[7] .............................................. G11B 7/013
(52) U.S. Cl. ................................ 369/53.31; 369/47.54
(58) Field of Search ............................ 369/30.3, 53.31, 369/53.37, 47.38, 84, 47.54; 711/1

(56) References Cited

U.S. PATENT DOCUMENTS

| | | | | |
|---|---|---|---|---|
| 5,351,226 A | * | 9/1994 | Mizumoto et al. ....... | 369/47.39 |
| 5,559,778 A | * | 9/1996 | Inokuchi et al. ......... | 369/53.24 |
| 5,721,856 A | * | 2/1998 | Takeuchi ................. | 711/1 |
| 6,091,683 A | * | 7/2000 | Yamaue ................... | 369/47.2 |
| 6,272,081 B1 | * | 8/2001 | Murata .................... | 369/47.15 |

* cited by examiner

Primary Examiner—Aristotelis M Psitos
(74) Attorney, Agent, or Firm—Pillsbury Winthrop LLP

(57) ABSTRACT

Upon loading of an optical disk into a CD-R/RW drive, access is first made to a given location within an innermost lead-in area of the optical disk, to retrieve a starting time of the innermost lead-in area from ATIP information. Then, access is made to a starting point of a PMA area of the disk, on the basis of the starting time of the innermost lead-in area, to retrieve PMA information. After that, on the basis of a time interval between adjoining tracks represented by the PMA information, the tracks are divided into a plurality of sessions. Next, access is made to a lead-in area of the last session to determine presence/absence and validity of lead-in information in the last session. Then, only when the lead-in information of the last session is judged to be valid, the lead-in information of the last session is retrieved as valid lead-in information. This way, for each multi-session-recorded CD-R or CD-RW disk, it is possible to reliably avoid erroneous retrieval of information of any old session that should have been erased previously from the disk.

20 Claims, 8 Drawing Sheets

FIG. 6

| SYNC | CNT | ADR | TNO | POINT | TIME | | | | PTIME | | | CRC |
|---|---|---|---|---|---|---|---|---|---|---|---|---|
| | | | | | MIN | SEC | FRAME | ZERO | PMIN | PSEC | PFRAME | |
| (2) | (4) | (4) | (8) | (8) | (8) | (8) | (8) | (8) | (8) | (8) | (8) | (16) |

FIG. 7

| SYNC | CNT | ADR | TNO | INDEX | TIME | | | | ATIME | | | CRC |
|---|---|---|---|---|---|---|---|---|---|---|---|---|
| | | | | | MIN | SEC | FRAME | ZERO | AMIN | ASEC | AFRAME | |
| (2) | (4) | (4) | (8) | (8) | (8) | (8) | (8) | (8) | (8) | (8) | (8) | (16) |

METHODS OF RETRIEVING INFORMATION FROM OPTICAL DISK AND CONTROLLING ACCESS AND RECORDING TO OPTICAL DISK, AND OPTICAL DISK RECORDING APPARATUS

BACKGROUND OF THE INVENTION

The present invention relates generally to methods of retrieving disk information from an optical disk, such as a CD-R or CD-RW disk (which will hereinafter be generically called a "CD-R/RW" disk), and controlling access and recording to a CD-R/RW disk, and optical disk recording apparatus for recording desired information onto a CD-R/RW disk. More particularly, the present invention is concerned with a technique which allows disk information to be obtained quickly and accurately from a multi-session-recorded CD-R/RW disk using PMA (Program Memory Area) information recorded in a PMA area of the optical disk and which permits access to each desired track and additional writing (including overwriting) of a track on the basis of the thus-retrieved disk information. Note that the terms "disk information" used in the context of the present invention refers to such information recorded in the PMA and TOC (Table Of Contents) areas of the CD-R/RW disk.

Multi-session recording is standardized as an example of various recording schemes applicable to the CD-R/RW disks. The multi-session recording scheme is characterized by recording a plurality of sessions on a CD-R/RW disk, each of which is a set of a lead-in area, a program area and a lead-out area. More specifically, in each of the sessions, the lead-in area has stored therein lead-in information such as TOC information of the individual tracks present in that session. In many cases, the program area in the session has stored therein information including user data and a path table continuing from a preceding session. Further, according to the multi-session recording scheme, the sessions are recorded on the disk one after another from the disk's inner circumference to the outer.

Therefore, the conventional CD-R drive, CD-RW drive or drive having a combination of the functions of the CD-R and CD-RW drives (hereinafter "CD-R/CD-RW drive") are designed in such a way that upon insertion or loading of a disk into the drive, Q subcode information in the innermost lead-in area is read out in order to retrieve all the disk information and latest user data (path table recorded in the last session) and then, once the disk in question has been identified as a multi-session-recorded disk, a "disk search" is conducted to search for all the disk information up to the last session and the path table recorded in the last session.

Among various approaches for searching for all the disk information up to the last session is to sequentially read the lead-in areas of the individual sessions. Namely, according to this approach, the TOC information of the first or leading session is read out along with program-starting-time information of the second session, then access is made, on the basis of the program-area-starting-time information of the second session, to the lead-in area of the second session to read out the TOC information of the second session along with program-starting-time information of the third session, then access is made, on the basis of the program-area-starting-time information of the third session, to the lead-in area of the third session to read out the TOC information of the third session along with program-starting-time information of the fourth session, and so on. Such procedures are repeated to sequentially access the lead-in areas of the individual sessions of the disk. When it is determined that there is no more data recorded in the lead-in area of a specific session accessed, the specific session is considered to be an unrecorded portion and the session immediately preceding the specific session is judged to be the last session. Once all the disk information up to the last session has been retrieved, access is made to the path table and the like recorded in the last session on the basis of the disk information of the last session, to thereby retrieve the path table and the like from the last session. Only after completion of the retrieval of these information, access to the individual tracks and additional writing of a new track become possible.

Further, the conventionally-known techniques for erasing an entire recorded surface of the CD-RW disk have two major types, the "full erase" and "quick erase". The "full erase" technique is characterized by writing logical "0"s onto the entire recorded surface and has the advantage of being able to completely erase all the recorded contents; however, this technique is disadvantageous in that it takes a long erasing time. For example, where the records are to be erased from a 74-minute disk at the standard (non-increased or non-reduced) speed, the full erase would take at least 74 minutes or more. The "quick erase" technique, on the other hand, is characterized by erasing information recorded in the PMA area existing inward of the lead-in area of the first session as well as information recorded from the lead-in area of the first session to a pre-gap in such a way that information recorded outward of the pre-gap is left unerased; note that the PMA area is an area for storing the PMA information pertaining to the currently-recorded track, such as starting and ending times etc. of the track, each time a succession of recording procedures is suspended. Also note that the PMA area also keeps storing the disk information of each already-completed session until the full erase or quick erase is instructed. Once the recorded information is erased from the PMA area and lead-in area of the first session, a multi-session-capable optical disk apparatus, having installed therein the CD-RW disk, is no longer able to obtain any information from either the initially accessed PMA area or the lead-in area of the first session, so that the optical disk apparatus determines that all the tracks have been erased. As a consequence, the quick erase technique can achieve the same advantage as the full erase technique by erasing operations of a shorter time.

However, with the above-mentioned approach of sequentially reading the lead-in areas of the individual sessions, a very long time would be taken to retrieve the information of all the tracks if the disk has a great many sessions, which would undesirably result in a long waiting time before reproduction or additional writing of a track is permitted.

Further, because the quick-erased CD-RW disk still has data on and after the first track of the first session left unerased, the following inconveniences tend to be encountered in newly performing multi-session recording. Namely, upon loading of a CD-RW disk having data recorded thereon up to the first session after the quick erasure, the multi-session-capable optical disk apparatus retrieves program-area-starting-time information of the second session from the lead-in area of a new first session and, on the basis of the starting-time information, accesses particular addresses where the lead-in area of the second session is supposed to exist. If certain data of any of the old sessions, which existed before the quick erasure, is still left at the accessed addresses, then the optical disk apparatus sometimes erroneously retrieves the left data. Particularly, if the left data is data of the lead-in areas of some old session, the optical disk apparatus would take it to be data of the lead-in area of the second session, on the basis of which it sequentially reads the data of the lead-in areas of the old sessions. By so doing, the optical disk apparatus would retrieve all the TOC information of the old sessions and also obtain the path table of the last one of the old sessions on the basis of the TOC information of the last session. Thus, although the new first session has now been recorded on the optical disk, no access can be made to individual files of the new first session due to the fact that the path table obtained includes no information corresponding to the new first session. Another inconvenience is that a new second session can not be recorded on the disk immediately after the new first session.

Furthermore, because no erasure takes place in the CD-R disk, arrangements have to be made to read out and reproduce all the records from the CD-R disk even where the disk failed in PMA recording.

SUMMARY OF THE INVENTION

The present invention provides solutions to the above-discussed problems of the conventional techniques. Namely, it is an object of the present invention to provide an information retrieving method, access controlling method and recording controlling method for use with an optical disk and an optical disk recording apparatus which permit quick retrieval of all recorded information from the optical disk in a case where the optical disk is a CD-R disk, or reliable avoidance of erroneous retrieval of old session information that should have been erased from the optical disk in a case where the optical disk is a CD-RW disk, and which permit access to individual tracks and additional writing of a track on the basis of the retrieved disk information.

To accomplish the above-mentioned object, the present invention provides a method of retrieving disk information from an optical disk, which comprises the steps of: accessing a given location within an innermost lead-in area of a CD-RW disk, to retrieve a starting time of the innermost lead-in area from ATIP information; accessing a starting point of a PMA area of the disk, on the basis of the starting time of the innermost lead-in area, to retrieve PMA information; then, on the basis of a time interval between adjoining tracks represented by the PMA information, dividing the tracks into a plurality of sessions and accessing a lead-in area of the last session to determine presence/absence and validity of lead-in information in the last session; and then, only when the lead-in information of the last session is judged to be valid, retrieving the lead-in information of the last session as valid lead-in information.

According to the disk information retrieving method arranged in the above-mentioned manner, the disk information of the individual sessions, such as respective track numbers, starting and ending times of tracks, is obtained from the PMA information recorded in the PMA area (for the first and last sessions, however, the disk information recorded in their respective lead-in areas may be used), so that the disk information of the individual sessions can be obtained in a very short time. Further, because a determination is made, for the last session, as to presence/absence and validity of lead-in information therein, the present invention can reliably avoid erroneous retrieval of information of any old session that should have been erased from the disk.

The validity of the lead-in information of the last session may be determined on the basis of a combination of one or more of the following:

presence/absence of an HF signal,
presence/absence of a lead-in area format, and
presence/absence of a logic erasure format in the lead-in area of the last session; and
comparison between TOC information included in the lead-in information of the last session and the PMA information.

Further, in this case, the above-mentioned comparison between the TOC information included in the lead-in information of the last session and the PMA information may be made on the basis of one or more of the following comparisons:

comparison between track numbers included in the TOC information and PMA information;
comparison between track starting times included in the TOC information and PMA information;
comparison between an ending time of a track included in the PMA information and a starting time of a next track included in the TOC information; and
comparison between an ending time of a last track included in the PMA information and a lead-out starting time included in the TOC information.

The present invention also provides a method which is directed to, after retrieval of disk information from the optical disk in accordance with the above-mentioned disk information retrieving method, controlling access to individual tracks of the optical disk on the basis of the PMA information included in the retrieved disk information.

The present invention also provides a method which is directed to, after retrieval of disk information from the optical disk in accordance with the above-mentioned disk information retrieving method, controlling recording on the optical disk through the steps of: when the lead-in information of the last session is judged to be valid, permitting additional writing of a next session on condition that a B0 pointer included in Q subcode information of the lead-in information of the last session is other than FF: FF: FF; and when there is no lead-in information in the last session or the lead-in information of the last session is judged to be invalid, permitting additional writing of a track next to the last session or recording, onto the last session, of lead-in and lead-out information to complete the last session.

According to another aspect of the present invention, there is provided an optical disk recording apparatus which includes a control section for performing any one of the above-mentioned methods at a given time after loading of a CD-RW disk into the recording apparatus.

According to still another aspect of the present invention, there is provided a method of retrieving disk information from an optical disk, which comprises the steps of: accessing a given location within an innermost lead-in area of a CD-R disk, to retrieve a starting time of the innermost lead-in area from ATIP information; accessing a starting point of a PMA area of the disk, on the basis of the starting time of the innermost lead-in area, to retrieve PMA information; on the basis of a time interval between adjoining tracks represented by the PMA information, dividing the tracks into a plurality of sessions and accessing a lead-in area of the last session to determine presence/absence lead-in information in the last session; when the lead-in information is present in the last session, determining whether a B0 pointer is present in Q subcode information of the lead-in information; then, when the B0 pointer is present in the Q subcode information of the lead-in information, accessing a lead-in area of a next session on the basis of a starting time of a program area of the next session included in the Q subcode information and determining presence/absence of lead-in information in the next session; and, then, when the lead-in information is present in the next session, retrieving the lead-in information from the next session. In this manner, readout of the lead-in information across every adjoining sessions can be sequentially performed up to a particular one of the sessions where the lead-in information is retrieved any longer or where the B0 pointer is retrieved any longer from the lead-in information.

According to the disk information retrieving method arranged in the above-mentioned manner, the disk information of the individual sessions, such as respective track numbers, starting and ending times of tracks, is obtained from the PMA information recorded in the PMA area (for the first and last sessions, however, the disk information recorded in their respective lead-in areas may be used), so that the disk information of the individual sessions can be obtained in a very short time. Further, even when there is failure in the PMA recording, the disk information can be retrieved appropriately by the sequential readout of the lead-in information.

The present invention also provides a method which is directed to, after retrieval of disk information from the CD-R disk in accordance with the above-mentioned disk information retrieving method, controlling access to individual tracks of the optical disk on the basis of the PMA information included in the retrieved disk information or, for each session for which no such PMA information is included in the disk information, on the basis of the lead-in information.

The present invention also provides a method which is directed to, after retrieval of disk information from a CD-R disk in accordance with the above-mentioned disk information retrieving method, controlling recording on the optical disk through the steps of: when lead-in information is present in an outermost session of said optical disk, permitting additional writing of a next session on condition that a B0 pointer is included in Q subcode information of the lead-in information of the outermost session; and when there is no lead-in information in the outermost session, permitting additional writing of a further session next to the outermost session or recording, onto the outermost session, of lead-in and lead-out information to complete the outermost session.

According to still another aspect of the present invention, there is provided an optical disk recording apparatus which includes a control section for performing any one of the above-described CD-R-disk-related methods at a given time after loading of a CD-R disk into the recording apparatus.

According to still another aspect of the present invention, there is provided an optical disk recording apparatus having a combination of the functions of CD-R and CD-RW drives (i.e., "CD-R/CD-RW drive"). This drive includes a control section which, at a given time after loading of an optical disk into the recording apparatus, identifies a type of the loaded optical disk and performs any one of the above-described CD-RW-disk-related methods when the loaded optical disk is identified as a CD-RW disk but performs any one of the above-described CD-R-disk-related methods when the loaded optical disk is identified as a CD-R disk.

BRIEF DESCRIPTION OF THE DRAWINGS

For better understanding of the object and other features of the present invention, its preferred embodiments will be described hereinbelow in greater detail with reference to the accompanying drawings, in which:

FIG. 6 is a diagram showing an exemplary format of Q subcodes in a lead-in area of the CD-R or CD-RW disk;

FIG. 7 is a diagram shows an exemplary format of Q subcodes in a program area and lead-out area of the CD-R or CD-RW disk;

DETAILED DESCRIPTION OF THE PREFERRED EMBODIMENTS

The basic principles of the present invention will hereinafter be described as applied to an optical disk apparatus equipped with a CD-R/RW drive that is capable of recording onto CD-R and CD-RW disks and reproduction from CD-R, CD-RW and CD-ROM disks.

Figure 5:
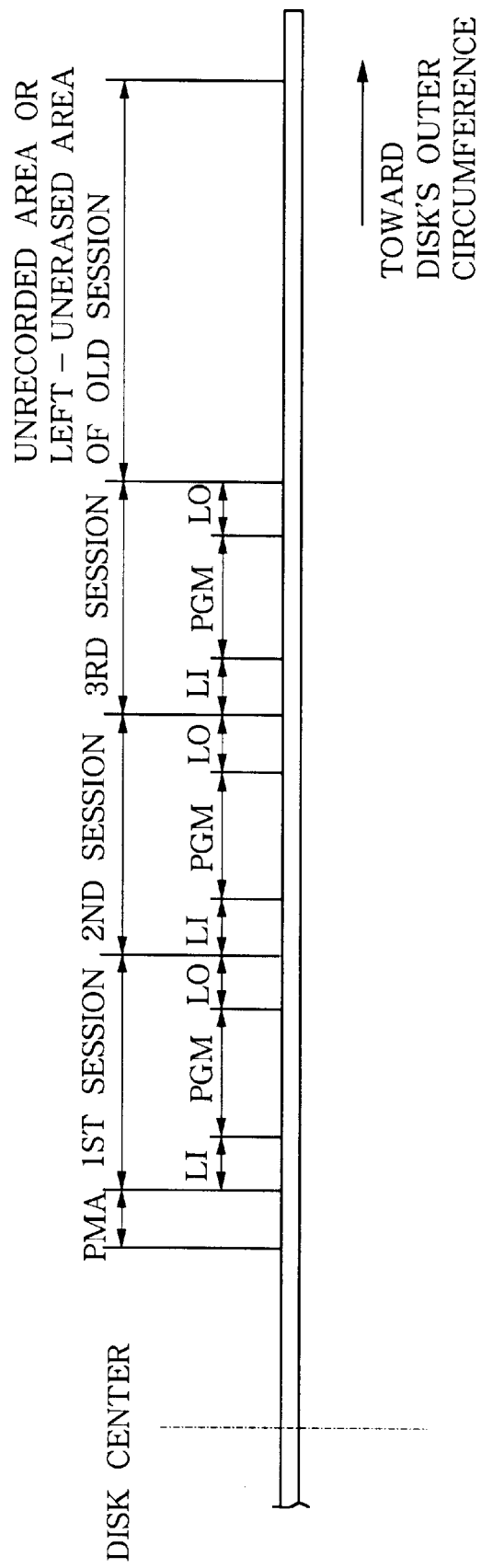
FIG. 5 is a diagram showing an exemplary recording format of a multi-session CD-R disk or multi-session CD-RW disk.

First, a brief description will be given about a typical format of multi-sessions recorded on the CD-R/RW disk. As shown in FIG. 5, the recording areas of the multi-session-recorded CD-R/RW disk are arranged to provide, in a direction from the disk's inner circumference to the outer, a PMA area, first session, second session, third session, . . . Each time a succession of recording procedures is suspended, new disk information, including a track number (numbered in consecutive order throughout the session), starting and ending times of the currently-recorded track, etc., is recorded in the PMA area immediately after the last disk information. Namely, in the PMA area, all the currently effective disk information is recorded in a sequential manner starting with the disk information of the first track, all of which can be erased by a "quick erase" operation; thus, all the disk information of the currently effective sessions is recorded together in the PMA area. In the case of "packet writing", the recording can be halted halfway through a track, in which situation the track number and starting time of the track that was being recorded are recorded into the PMA area of the CD-RW disk; for example, only "FF: FF: FF" is recorded because the ending time of the track has not yet been established. Then, upon completion of the recording on the track, the established ending time of the track is overwritten. On the other hand, when the recording on the CD-R disk is halted halfway through a track, the disk information of the track, such as the track number and starting and ending times of the track, is recorded only upon completion of the recording of that track, rather than simultaneously with the halt.

As further shown in FIG. 5, each of the sessions includes, in the inner-to-outer direction of the disk, a lead-in area LI, a program area PGM and a lead-out area LO. In the lead-in area LI, there is recorded, in pits, lead-in information including TOC information of the session. The TOC information includes various information, such as respective starting times of the individual tracks within the session and a starting time of the lead-out area. Further, in a pre-groove of the lead-in area LI, a starting time of the lead-in area LI is recorded as special ATIP (Absolute Time In Pre-groove) information. Starting time of the PMA area is set to be 1,000 frames before the starting time of the lead-in area. Further, the special ATIP information pertaining to the lead-in area includes identification information indicating that the disk is a CD-R disk or a CD-RW disk.

As with the conventional optical disks, the lead-in area of the first session is located 23–25 mm from the center of the disk. Further, the lead-out area of the first session is set to such a length as to provide a frame of one minute and thirty seconds (hereinafter noted as "01:30:00"). The lead-in areas of the second session and other sessions following the same are each set to a length of "01:00:00", while their lead-out areas are each set to a length of "00:30:00".

FIG. 6 shows a format of Q subcodes in the lead-in areas. Each of the lead-in areas can be identified by TNO=0, and the multi-session recording can be identified from a combination of ADR=5 (mode 5) and fact that a relative time TIME is other than "FF: FF: FF" when POINT=B0. The relative time TIME (other than "FF: FF: FF") when ADR=5 and POINT=B0 indicates a starting time of the program area in the next session. When POINT=1–99, PTIME represents a starting time of a track represented by the POINT value. When POINT=A0, PMIN represents a first track number of the session. When POINT=A1, PMIN represents a last track number of the session. When POINT=A2, PMIN represents a starting time of the lead-out area in the session.

Further, FIG. 7 shows an exemplary format of Q subcodes in the program area and lead-out area. The program area and lead-out area can be distinguished from each other by ascertaining whether TNO is "0" or not. Specifically, TNO in the program area represents a track number of the track where it is located. In the lead-out area, TNO=AA(h). INDEX "0" is recorded, as a pre-gap information of the first track, for first two seconds from the starting time of the program area. Immediately after the INDEX "0", an INDEX "1" area is recorded as user data. Note that TIME represents a relative time within the track, and ATIME represents an absolute time measured from the starting time of the program area in the first session. If INDEX=1, the in-track relative time TIME starts with "00:00:00" and then progressively increases in value, while if INDEX=0, the time TIME progressively decreases in value so that it ends with "00:00:00".

Recording on the CD-R/RW disk is carried out by sequential track writing in the inner-to-outer direction of the disk.

Recording of each session is completed by recording lead-in and lead-out information on the basis of track information recorded in the PMA information pertaining to that session.

Normally, the quick erase operation is performed on the CD-R/RW disk by recording erasure data, in a predetermined erasure format, into the PMA area and the lead-in area and pre-gap of the first session. Data residing outwardly of the pre-gap (i.e., data at and after the first track) of the first session are left unerased.

Figure 8:
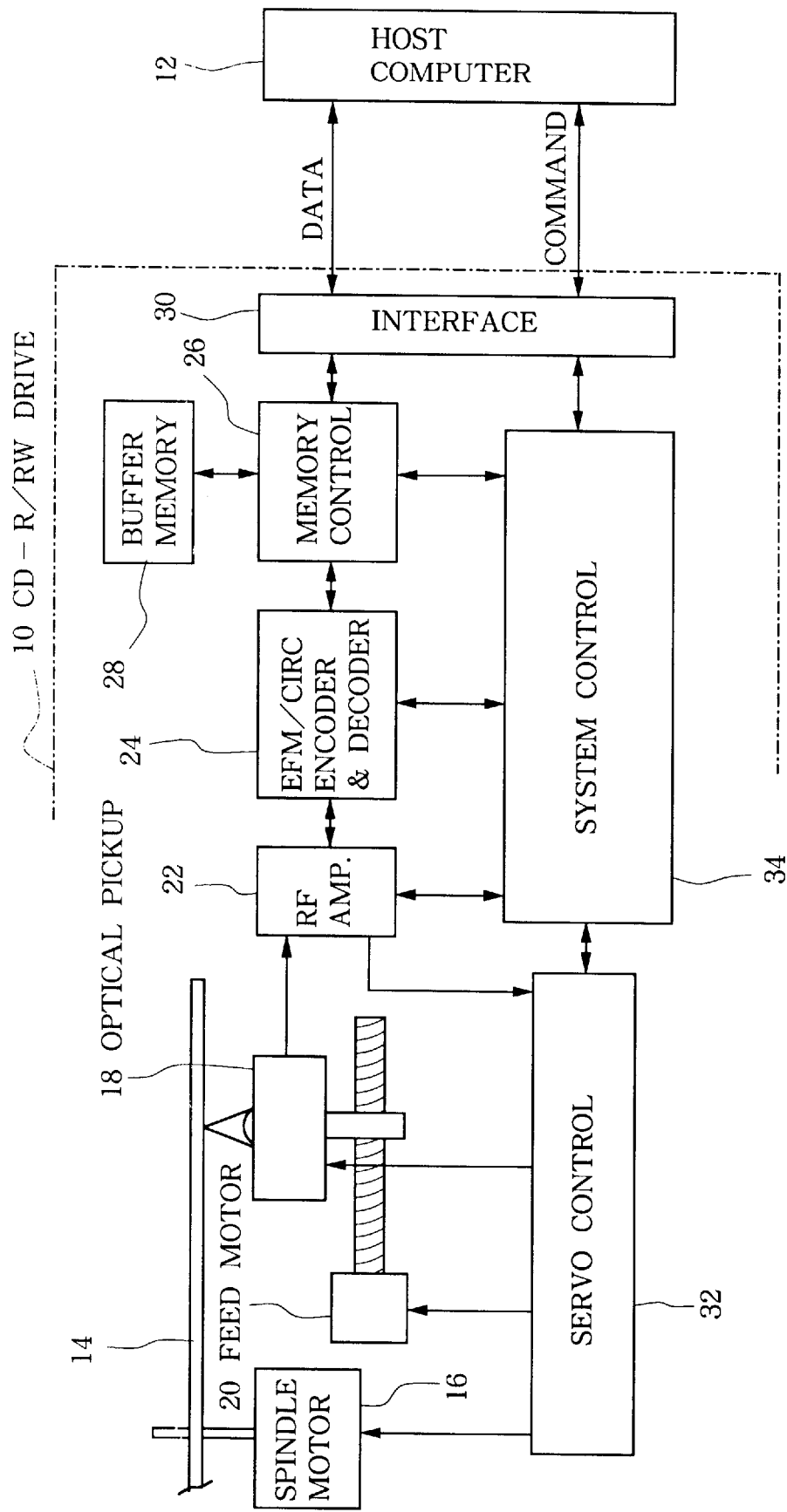
FIG. 8 is a block diagram showing an exemplary hardware setup of an optical disk recording apparatus in accordance with a preferred embodiment of the present invention.

Referring now to FIG. 8, there is shown an exemplary hardware setup of the optical disk recording apparatus in accordance with a preferred embodiment of the present invention. The optical disk recording apparatus generally comprises a combination of a CD-R/RW drive 10 and a host computer 12 such as a personal computer. Optical disk 14, such as a CD-R, CD-RW or CD-ROM disk, is driven to rotate via a spindle motor 16 so that information recording/reproduction is performed thereon via an optical pickup 18. In reproduction, the optical pickup 18 is moved in a radial direction of the optical disk 14. Each data read out by the optical pickup 18 is passed via an RF amplifier 22 to an EFM/CIRC encoder and decoder 24, where it is subjected to EFM demodulation and error correction processes. By means of a memory control section 26, the thus-demodulated data is temporarily stored into a buffer memory 28 and then read out from the buffer memory 28 in accordance with internal reference clock pulses of the CD-R/RW drive 10 so as to remove unwanted jitter components from the data. Then, the data is transmitted via an interface section 30 to the host computer 12.

In recording, each recording signal supplied from the host computer 12 is temporarily stored via the interface section 30 into the buffer memory 28 by means of the memory control section 26. Then, the recording signal is read out from the buffer memory 28 in accordance with the internal reference clock pulses of the CD-R/RW drive 10 and sent to the EFM/CIRC encoder and decoder 24, where it is subjected to EFM modulation and error-correction-code imparting processes. The thus-processed recording signal is recorded onto the optical disk 14 by the optical pickup 18 being driven via the RF amplifier 22.

On the basis of output signals from the RF amplifier 22, a servo control section 32 performs focusing and tracking servo control of the optical pickup 18, as well as feeding servo control of the feed motor 20. In response to an instruction from the host computer 12 or the like, a system control section 34 controls various components of the CD-R/RW drive 10 which are designed to execute the instruction. Note that a main control of the inventive optical disk recording apparatus is constructed by a combination of the host computer 12 and system control section 34.

Figure 9:
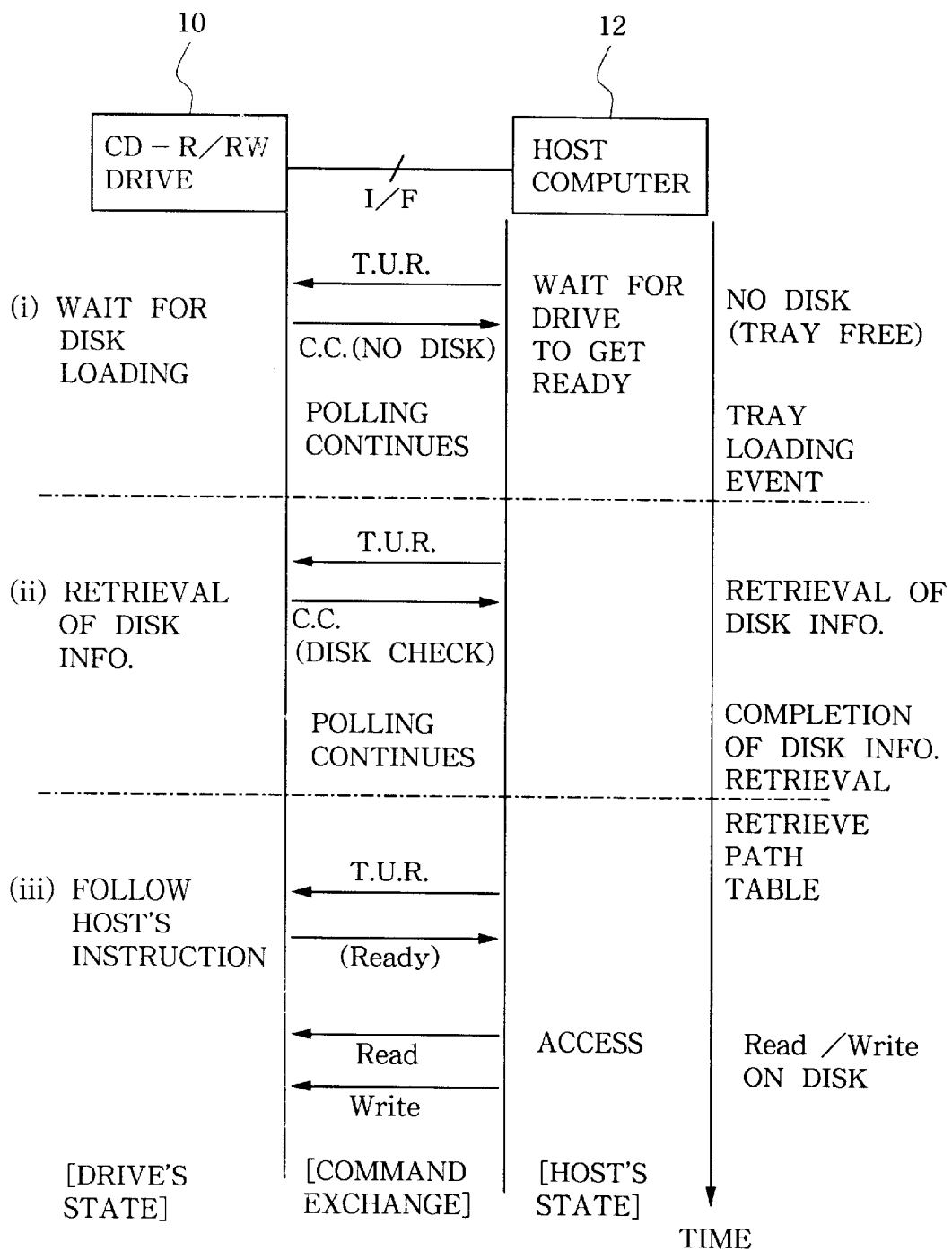
FIG. 9 is a time chart showing an exemplary manner in which information is communicated between a host computer and the CD-R/RW drive when the optical disk is loaded into the drive.

FIG. 9 shows an exemplary manner in which information is communicated between the host computer 12 and the system control section 34 of the CD-R/RW drive 10 when the optical disk 14 is loaded into the drive 10. While a disk tray of the CD-R/RW drive 10 is free of optical disk, i.e., while no disk is loaded into the drive 10, the host computer 12 outputs a Test Unit Ready (T.U.R.) command to inquire whether the CD-R/RW drive 10 is ready or not. In response to the T.U.R. command from the host computer 12, the CD-R/RW drive 10 outputs, as Check Condition (C.C.) information, information indicating "No Disk Loaded". Exchange of these information is repeated in a polling fashion.

Once the disk 14 is loaded in the CD-R/RW drive 10, the drive 10 retrieves the disk information from the disk 14, during which time the drive 10 outputs, as the C.C. information, information indicating that the disk information is being currently retrieved from the loaded disk. Upon completion of the disk information retrieval, the CD-R/RW drive 10 sends a "Ready States" message to the host computer 12. In turn, the host computer 12 issues a Read command to retrieve a path table from the last session of the disk 14 and perform recording or reproduction to or from the disk 14 as necessary.

FIGS. 1–4 show exemplary flows for controlling readout of the disk information from the optical disk 14 loaded in the CD-R/RW drive 10. The control of FIGS. 1–4 is performed voluntarily by the drive 10 while the host computer 12 is sending the Test Unit Ready command to the system control section 34 to inquire about the current state of the drive 10.

Figure 1:
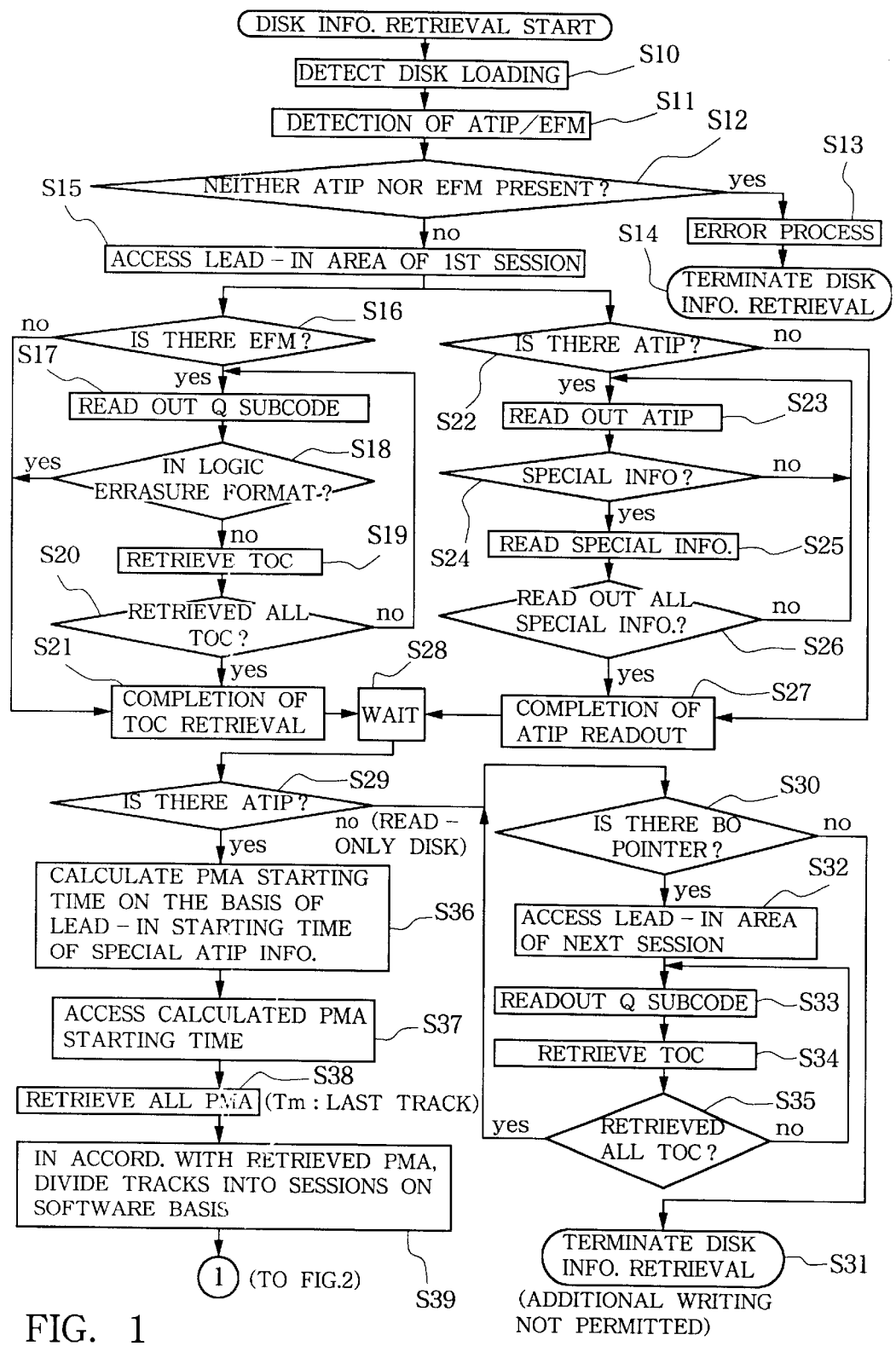
FIG. 1 is a flow chart explanatory of a disk information retrieval process in accordance with a preferred embodiment of the present invention, which particularly shows an exemplary operational flow for controlling readout of disk information from an optical disk loaded in a CD-R/RW drive of the present invention.

In FIG. 1, once the loading, into the CD-R/RW drive 10, of the optical disk 14 is detected at step S10, control goes to step S11 to detect presence/absence of ATIP information and EFM signal (HF signal). If neither the ATIP information nor the EFM signal has been detected as determined at step S12, a predetermined error process is carried out at step S13 and then a disk information retrieving process is terminated at step S14 without performing any other operation. If either or both of the ATIP information and the EFM signal has been detected, then access is made, at step S15, to a given location in the lead-in area (23–25 mm apart radially from the center of the disk 14) of the disk's first session. At this step S15, retrieval of the TOC information and retrieval of the ATIP information is conducted simultaneously in a parallel fashion.

Namely, if no EFM signal has been detected as determined at step S16, the retrieval of the TOC information is terminated at step S21. If, on the other hand, the EFM signal has been detected as determined at step S16, then the Q subcodes are read out at step S17. If the Q subcodes are in the logic erasure format, the retrieval of the TOC information is terminated at step S21. If, on the other hand, the Q subcodes are not in the logic erasure format, the TOC information included in the Q subcode information is retrieved at step S19. Once all the TOC information has been retrieved as determined at step S20, the retrieval of the TOC information is terminated at step S21.

Regarding the retrieval of the ATIP information, if it has been determined that there is no ATIP information at step S22, the retrieval is terminated at step S27. If, on the other hand, it has been determined that there is ATIP information at step S22, the ATIP information is retrieved at step S23. Once all the special ATIP information has been retrieved at steps S24–S26, the retrieval of the ATIP information is brought to an end at step S27.

Upon completion of the retrieval of the TOC and ATIP information, different operations are performed depending on whether the ATIP information has been retrieved or not, after step S29. Namely, if no ATIP information has been retrieved as determined at step S29, it can be seen that the loaded optical disk 14 is a read-only disk such as a CD-ROM, no PMA retrieving operation is performed, but the TOC information of the individual sessions is sequentially read out. Namely, a determination is made at step S30 as to whether the TOC information read out from the lead-in area of the first session includes a B0 pointer. If there is no B0 pointer as determined at step S30, the disk information retrieving process is terminated at step S31. If, however, there is such a B0 pointer in the TOC information, it can be seen that the loaded optical disk is of the multi-session type, so that access is made, at step S32, to a given location in the program area of the next session, represented by the relative time TIME when the B0 pointer has been read out, on the basis of the starting time information of the program area of the next session, in order to read out the Q subcodes at step S33 and then retrieve the TOC information therefrom at step S34. Once all the TOC information has been retrieved at step S35, it is further determined whether the TOC information includes a B0 pointer at step S30. If there is such a B0 pointer as determined at step S30, control proceeds to a further next session to read the TOC information therefrom through the operations of steps S32 S35. These operations are repeated up to a session where no B0 pointer is retrieved any longer. When no B0 pointer has been retrieved any longer as determined at step S30, the disk information retrieving process is terminated at step S31. In this way, the TOC information of all the sessions can be retrieved from the loaded disk.

If the ATIP information has been retrieved as determined at step S29, it can been seen that the loaded optical disk is a CD-R or CD-RW disk, and thus the PMA information is read out. Namely, the starting time of the PMA area is calculated at step S36 by subtracting a time value of 1,000 frames from the starting time value of the lead-in area of the first session which is included in the special ATIP information. At next step S37, access is made to a location slightly before the thus-calculated time point. Once all the PMA information has been retrieved at step S38, tracks T1-Tm, represented by or included in the PMA information, are divided at step S39 into a plurality of sessions, on a software basis, in accordance with the thus-retrieved PMA information. More specifically, because the PMA information includes the starting and ending times of the individual tracks, a time difference or interval is calculated between the ending time of each track and the starting time of the next track, i.e., between every adjoining tracks. Although such a time difference or interval is relatively small within a same session, the time difference between the ending time of the last track in each session and the starting time of the first track in the next session is longer (e.g., 0.1:30:00 in the case of the first session, or 00:02:00 in the case of the second and subsequent sessions) because there exist, in between the two times, a lead-out area (having a "01:30:00" length in the case of the first session, or a "00:30:00" length in the second and subsequent sessions). Therefore, in the illustrated example, the respective time intervals between the adjoining tracks T1-Tm represented by the PMA information are calculated and compared with a predetermined reference time (e.g., 01:30:00). If the calculated time interval between given adjoining tracks is smaller than the predetermined reference time, the adjoining tracks in question are judged to be within a same session, while if the calculated time interval is greater than the reference time, then the adjoining tracks in question are judged to be in different sessions, i.e., adjoining each other across a boundary between two successive sessions. In this manner, all the tracks T1-Tm represented by or included in the PMA information can be divided into a plurality of sessions.

If the PMA information indicates a single session as a result of the session division (YES determination at step S40), different operations are performed at and after step S41 depending on whether or not the TOC information has been retrieved through the operations of steps S16–S21. Namely, if the TOC information has not been retrieved, control goes to the flows of FIG. 4 to be later described. If the TOC information has been retrieved, presence/absence of a next session is examined at step S42. If the loaded optical disk is a CD-R disk and has no B0 pointer or if the loaded optical disk is a CD-RW disk and has a B0 pointer of "FF: FF: FF", this means that there is no next session, so that the disk information retrieving process is terminated at step S43. Because the optical disk is concluded with the first session alone, no additional writing is permitted.

If the loaded optical disk is a CD-RW disk and the B0 pointer is other than "FF: FF: FF" as determined at step S44, i t can be seen that the current recording is of the multi-session type and the recording has not yet been completed on the loaded optical disk, so that the disk information retrieving process is terminated at step S45. In this case, additional writing is permitted starting with the leading track of the next session. If the loaded optical disk is a CD-R disk and has a B0 pointer, it can be seen that the current recording is of the multi-session type and has not been completed yet on the loaded optical disk, so that access is made to the lead-in area of the next session at step S46.

If the PMA information has been found to concern multiple sessions as a result of the session division (NO determination at step S40) and if the loaded optical disk is a CD-R disk as determined at step S47, access is made, at step S48, to a given location in the lead-in area of a last one of the divided sessions. The lead-in area of the last session is determined arithmetically as a section preceding the starting time (01:02:00–00:02:00) of the first track of the last session which is included in the PMA information, and the access is made to an appropriate designated time position (i.e., a time position appropriate for completely retrieving the TOC information). Once the lead-in area of the last session is accessed, a determination is first made at step S49 as to whether or not there is an EFM signal (HF signal) signal in the accessed area. If answered in the affirmative at step S49, control goes to step S50 to read out the Q subcodes and then to step S51 to retrieve the TOC information. Once all the TOC information has been retrieved as determined at step S52, a further determination is made at step S53 as to whether the TOC information includes a B0 pointer. If there is included such a B0 pointer in the TOC information, access is made, at step S54, to a given location in the lead-in area of a next session, represented by the relative time TIME when the B0 pointer has been read out, on the basis of the starting time information of the program area of the next session, in order to sequentially read out the TOC information up to a session where no EFM signal or no B0 pointer is retrieved any longer (steps S49–S54). When there has come the session where no B0 pointer is retrieved any longer, this means that the disk has been concluded with that session, so that control goes to step S55 to set a flag indicating that no additional writing is permitted.

If there has come the session where no EFM pointer is retrieved any longer as determined at step S49 or if the "no additional writing" flag has been set as determined at step S55, it is further determined at step S56 whether or not the last track number Tn included in the TOC information is greater than the last track number Tm included in the PMA information (i.e., Tn>Tm). If Tn>Tm, this means that the recording on the track Tm+1 or Tn has failed due to some reason, the disk information retrieving process is terminated at step S57 to inhibit additional writing. If the condition Tn>Tm is not found, it is ascertained at step S58 whether the "no additional writing" flag has been set at step S55. If the "no additional writing" flag has been set at step S55, the disk information retrieving process is terminated at step S59 to inhibit additional writing. If, however, the "no additional writing" flag has not been set at step S55, then control moves on to the flow of FIG. 4.

Figure 4:
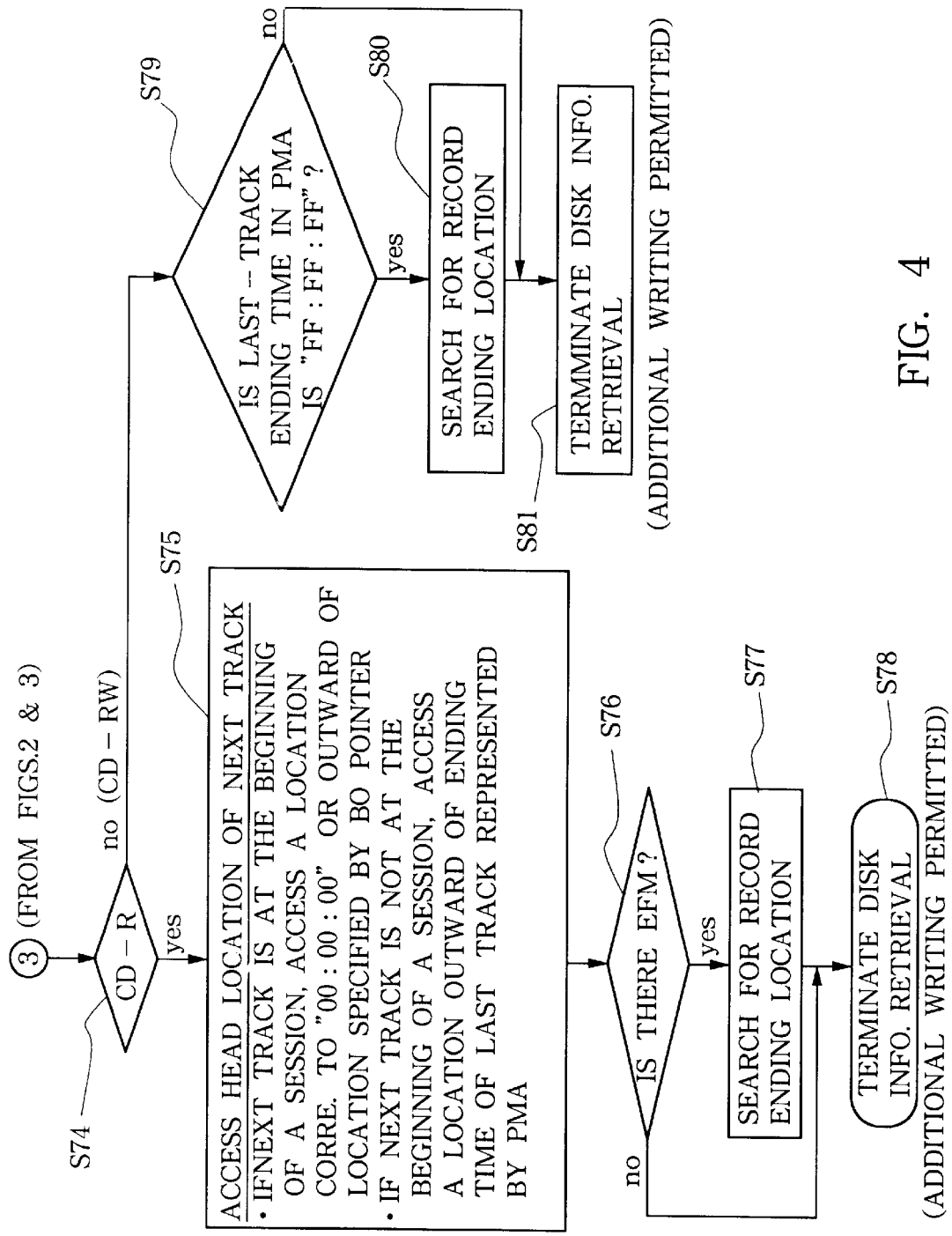
FIG. 4 is a flow chart showing a continuation of the flow of FIG. 3.

If the PMA information has been found to concern multiple sessions as a result of the session division (NO determination at step S40) and if the loaded optical disk is a CD-RW disk as determined at step S47, access is made, at step S60 of FIG. 4, to a given location in the lead-in area of the last one of the divided sessions. Here, not only presence/absence of TOC information in the lead-in area but also validity of the TOC information is examined. Namely, presence/absence of an EFM signal (HF signal) in the lead-in area of the last session is first examined at step S61. If there is no EFM signal as determined at step S61, operations of FIG. 4 are carried out in a later-described manner. If, however, there is such an EFM signal, control proceeds to step S62 to read out the Q subcodes. Further, it is determined whether the read-out Q subcodes are in the logic erasure format (step S63), or in the program area format or lead-out area format (step S64). If the read-out Q subcodes are in any of the above-mentioned formats and if there is any track information obtained in the last session, the track information is discarded at step S65 and then the operations of FIG. 4 are carried out as will be described later. In case the read-out Q subcodes are in none of the above-mentioned formats, control goes to step S66 to retrieve TOC information.

Upon completion of retrieval of all the TOC information, determinations are made as to whether the PMA information and TOC information matches with each other in track number represented thereby (step S68), whether the PMA information and TOC information matches with each other in track starting time represented thereby (step S69), and whether the PMA information includes information indicative of a track for which the packet writing has not been completed (i.e., whose track ending time is "FF: FF: FF" and which will hereinafter be called a "packet-write-uncompleted track") (step S70). If the PMA information and TOC information fails to match with each other in track number or track starting time or if there is a packet-write-uncompleted track, the TOC information is judged to be improper or invalid (i.e., remnant or left-unerased TOC information of some old session), so that the track information retrieved in the last session, if any, is discarded at step S65. The TOC information of the last session is judged to be proper or valid only when the PMA information and TOC information matches with each other in track number and track starting time and the PMA information includes no information indicative of a packet-write-uncompleted track.

To examine the validity of the TOC information in the last session of the CD-RW disk, the PMA information and TOC information ma be compared in terms of any other items than the above-mentioned track number and track starting time; for example, comparison may be made between the ending time of a track included in the PMA information and the starting time of a next track included in the TOC information and/or between the ending time of the last track included in the PMA information and the lead-out starting time included in the TOC information. The comparison between the track ending time included in the PMA information and the next track's starting time included in the TOC information may be performed by determining whether or not a time difference between the two times is within a predetermined value of "00:02:00". Further, the comparison between the track ending time included in the PMA information and the lead-out starting time included in the TOC information may be performed by determining whether or not the two times match with each other.

If the TOC information of the last session has been determined as valid in the above-mentioned manner, control proceeds to step S71 to check a value of the relative time TIME. If the relative time TIME is "FF: FF: FF", it can be seen that the recording on the optical disk has been completed, so that the disk information retrieving process is brought to an end at step S72. In this case, no additional writing is permitted. If, however, the relative time TIME specified by the B0 pointer is other than "FF: FF: FF", it can be seen that the B0 pointer indicates the program-area starting time of the next session, so that the disk information retrieving process is brought to an end at step S73. In this case, additional writing is permitted following the leading track of the next session.

Figure 2:
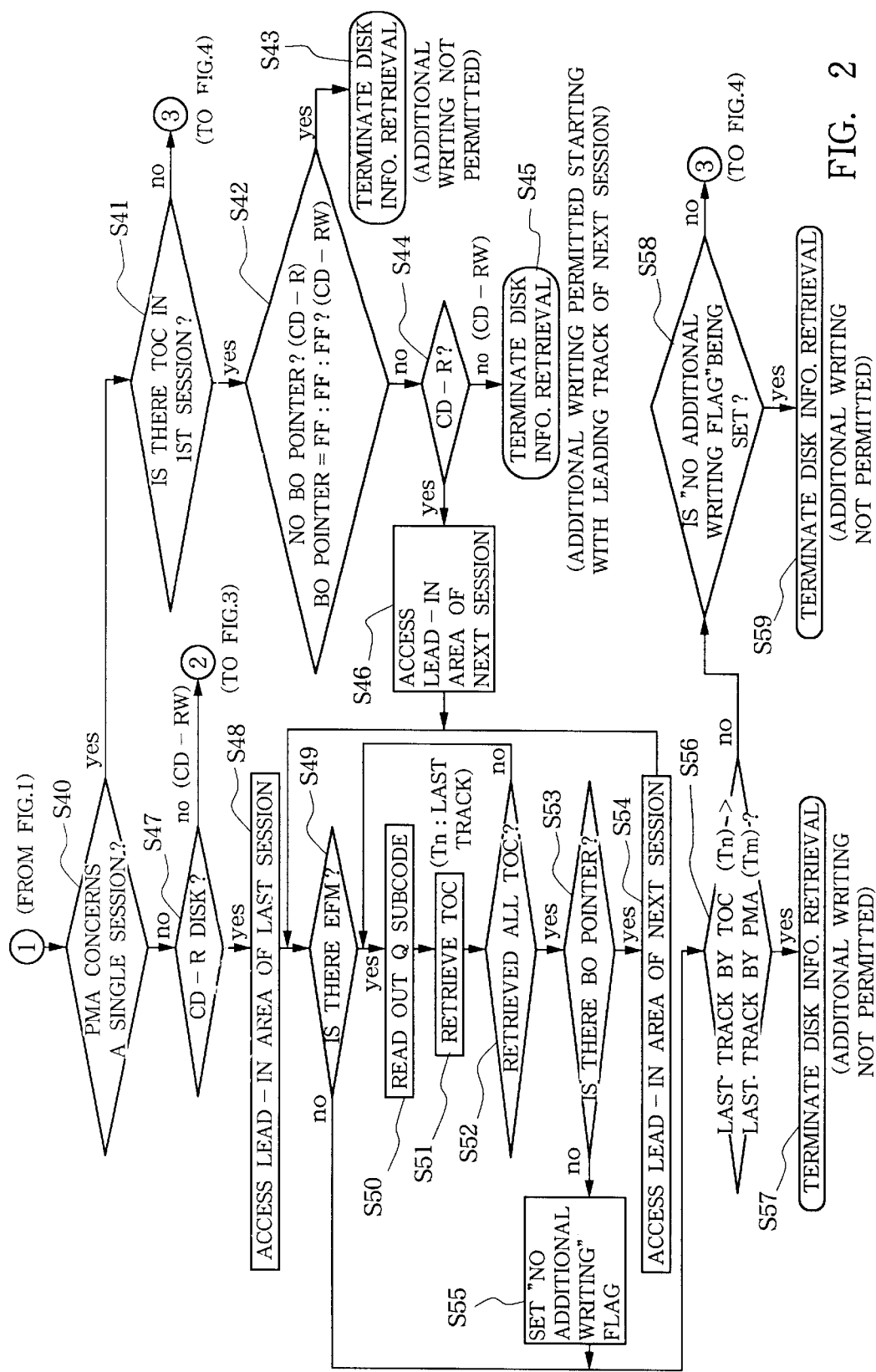
FIG. 2 is a flow chart showing a continuation of the flow of FIG. 1.
Figure 3:
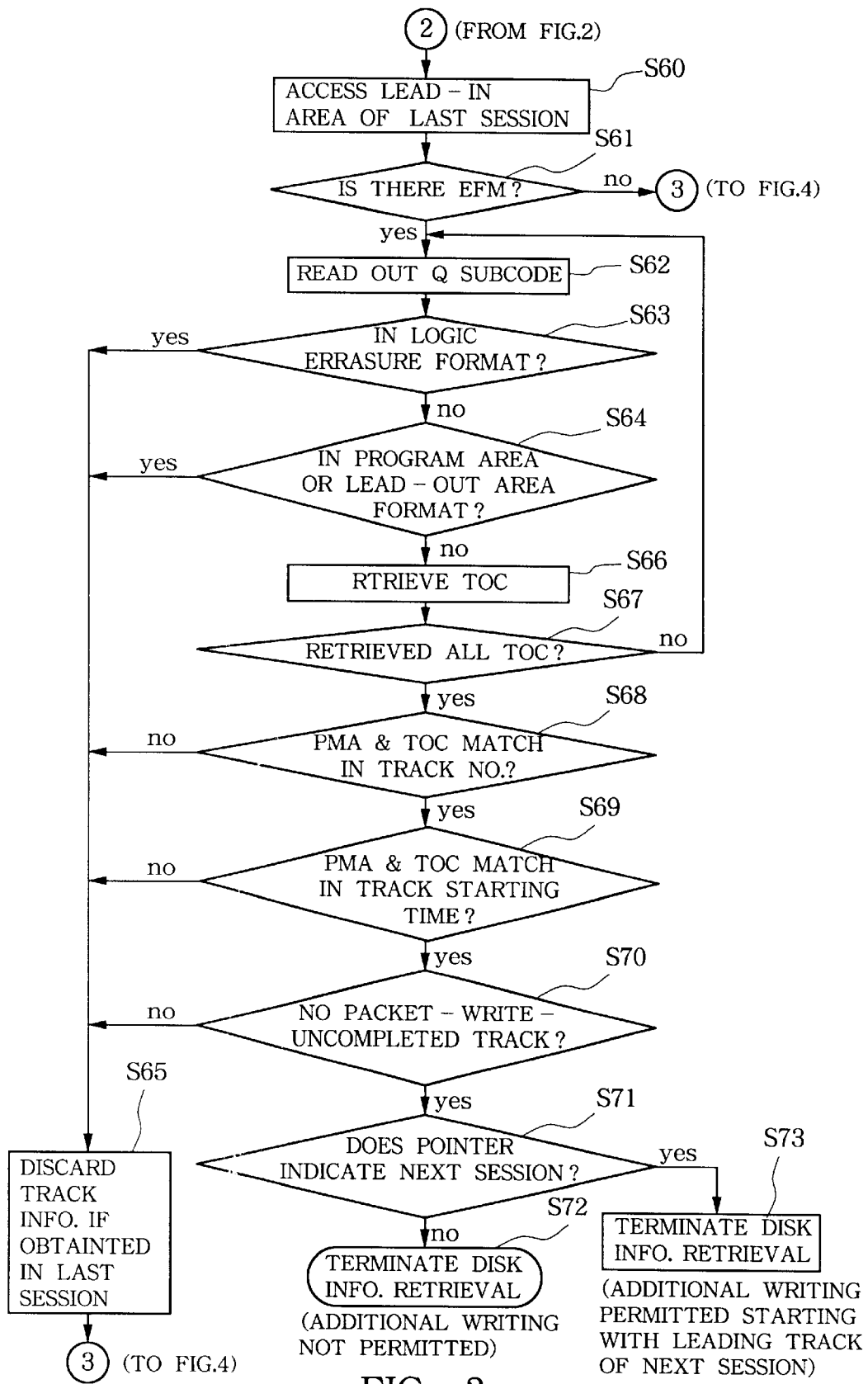
FIG. 3 is a flow chart showing a continuation of the flow of FIG. 2.

FIG. 4 is a flow chart showing exemplary operations performed in response to the negative (NO) determination at step S41 or S58 of FIG. 2 or step S61 of FIG. 3, or following the operation of step S65 of FIG. 3. If the loaded optical disk is a CD-R disk as determined at step S74, access is made to the head location of a next track at step S75. Namely, if the next track is at the beginning of a particular session, access is made to a location corresponding to an absolute time ATIME of "00:00:00" (i.e., the head of the program area of the first session) or to a location outward of the location specified by the B0 pointer of the preceding session (i.e., starting point of the program area of the next session). If the next track is not the leading track of the particular session, access is made to a location outward of the ending time of the last track represented by the PMA information. Then, presence/absence of an EFM signal (HF signal) at the accessed location is examined at step S76. If there is such an EFM signal at the accessed location, a search is made, at step S77, for a recording ending location (i.e., a location where no more EFM signal is detected). Upon detection of such a recording ending location, the disk information retrieving process is brought to an end at step S78. In the event that no EFM signal is detected at the accessed location, the disk information retrieving process is similarly brought to an end at step S78. In these cases, additional writing is permitted following the recording ending location.

If the loaded optical disk is a CD-RW disk as determined at step S74, a further determination is made at step S79 as to whether the last-track ending time included in the PMA information is "FF: FF: FF" meaning that there is a packet-write-uncompleted track. If so, a search is made, at step S80, for a recording ending location (i.e., a location where no more EFM signal is detected). Upon detection of such a recording ending location, the disk information retrieving process is brought to an end at step S81. In the event that no EFM signal is detected at the accessed location, the disk information retrieving process is similarly brought to an end at step S81. In these cases, additional writing is permitted following the recording ending location.

What is claimed is:

1. A method of retrieving disk information from an optical disk comprising the steps of:
   accessing a given location within an innermost lead-in area of a CD-RW disk, to retrieve a starting time of the innermost lead-in area from ATIP information;
   accessing a starting point of a PMA area of the disk, on the basis of the starting time of the innermost lead-in area, to retrieve PMA information;
   on the basis of a time interval between adjoining tracks represented by the PMA information, dividing the tracks into a plurality of sessions and accessing a lead-in area of a last one of the sessions to determine presence/absence and validity of lead-in information in the last session; and
   only when the lead-in information of the last session is judged to be valid, retrieving the lead-in information of the last session as valid lead-in information.

2. A method as claimed in claim 1 wherein the validity of the lead-in information of the last session is determined on the basis of a combination of one or more of presence/absence of an HF signal, presence/absence of a lead-in area format and presence/absence of a logic erasure format in the lead-in area of the last session and comparison between TOC information included in the lead-in information of the last session and the PMA information.

3. A method as claimed in claim 2 wherein the comparison between the TOC information included in the lead-in information of the last session and the PMA information is made on the basis of one or more of comparisons between track numbers included in the TOC information and PMA information, between track starting times included in the TOC information and PMA information, between an ending time of a track included in the PMA information and a starting time of a next track included in the TOC information and between an ending time of a last track included in the PMA information and a lead-out starting time included in the TOC information.

4. A method of controlling access to individual tracks of an optical disk, after retrieval of disk information from said optical disk, on the basis of PMA information included in the retrieved disk information, said retrieval of disk information from said optical disk being performed by:
   accessing a given location within an innermost lead-in area of a CD-RW disk, to retrieve a starting time of the innermost lead-in area from ATIP information;
   accessing a starting point of a PMA area of the disk, on the basis of the starting time of the innermost lead-in area, to retrieve PMA information;
   on the basis of a time interval between adjoining tracks represented by the PMA information, dividing the tracks into a plurality of sessions and accessing a lead-in area of a last one of the sessions to determine presence/absence and validity of lead-in information in the last session; and
   only when the lead-in information of the last session is judged to be valid, retrieving the lead-in information of the last session as valid lead-in information.

5. A method of controlling recording on an optical disk after retrieval of disk information from said optical disk, said retrieval of disk information from said optical disk being performed by:
   accessing a given location within an innermost lead-in area of a CD-RW disk, to retrieve a starting time of the innermost lead-in area from ATIP information;
   accessing a starting point of a PMA area of the disk, on the basis of the starting time of the innermost lead-in area, to retrieve PMA information;
   on the basis of a time interval between adjoining tracks represented by the PMA information, dividing the tracks into a plurality of sessions and accessing a lead-in area of a last one of the sessions to determine presence/absence and validity of lead-in information in the last session; and
   only when the lead-in information of the last session is judged to be valid, retrieving the lead-in information of the last session as valid lead-in information,
   said method of controlling recording comprising the steps of:
   when the lead-in information of the last session is judged to be valid, permitting additional writing of a next session on condition that a B0 pointer included in Q subcode information of the lead-in information of the last session is other than FF: FF: FF; and
   when there is no lead-in information in the last session or the lead-in information of the last session is judged to be invalid, permitting additional writing of a track next to the last session or recording, onto the last session, of lead-in and lead-out information to complete the last session.

6. A program code storage medium encoded with instructions which cause an optical disk recording apparatus to
   access a given location within an innermost lead-in area of a CD-RW disk, to retrieve a starting time of the innermost lead-in area from ATIP information;

access a starting point of a PMA area of the disk, based on the starting time of the innermost lead-in area, to retrieve PMA information;

based on a time interval between adjoining tracks represented by the PMA information, divide the tracks into a plurality of sessions and to access a lead-in area of a last one of the sessions to determine presence/absence and validity of lead-in information in the last session; and only when the lead-in information of the last session is judged to be valid, retrieve the lead-in information of the last session as valid lead-in information.

7. A program code storage medium as claimed in claim 6, wherein the medium further includes instructions which cause the optical disk recording apparatus to:

when the lead-in information of the last session is judged to be valid, permit additional writing of a next session on condition that a B0 pointer included in Q subcode information of the lead-in information of the last session is other than FF: FF: FF; and when there is no lead-in information in the last session or the lead-in information of the last session is judged to be invalid, permit additional writing of a track next to the last session or recording, on to the last session, of lead-in and lead-out information to complete the last session.

8. A method of retrieving disk information from an optical disk comprising the steps of:

accessing a given location within an innermost lead-in area of a CD-R disk, to retrieve a starting time of the innermost lead-in area from ATIP information;

accessing a starting point of a PMA area of the disk, on the basis of the starting time of the innermost lead-in area, to retrieve PMA information;

on the basis of a time interval between adjoining tracks represented by the PMA information, dividing the tracks into a plurality of sessions and accessing a lead-in area of a last one of the sessions to determine presence/absence lead-in information in the last session;

when the lead-in information is present in the last session, determining whether a B0 pointer is present in Q subcode information of the lead-in information;

when the B0 pointer is present in the Q subcode information of the lead-in information, accessing a lead-in area of a next session on the basis of a starting time of a program area of the next session included in the Q subcode information and determining presence/absence of lead-in information in the next session; and when the lead-in information is present in the next session, retrieving the lead-in information from the next session, whereby readout of the lead-in information across adjoining ones of the sessions is sequentially performed up to a particular one of the sessions where the lead-in information is retrieved any longer or where the B0 pointer is retrieved any longer from the lead-in information.

9. A method of controlling access to individual tracks of an optical disk, after retrieval of disk information from said optical disk, on the basis of PMA information included in the retrieved disk information or, for each session for which no PMA information is included in the disk information, on the basis of lead-in information, said retrieval of disk information from said optical disk being performed by:

accessing a given location within an innermost lead-in area of a CD-R disk, to retrieve a starting time of the innermost lead-in area from ATIP information;

accessing a starting point of a PMA area of the disk, on the basis of the starting time of the innermost lead-in area, to retrieve PMA information;

on the basis of a time interval between adjoining tracks represented by the PMA information, dividing the tracks into a plurality of sessions and accessing a lead-in area of a last one of the sessions to determine presence/absence and validity of lead-in information in the last session;

when the lead-in information is present in the last session, determining whether a B0 pointer is present in Q_subcode information of the lead-in information;

when the B0 pointer is present in the Q subcode information of the lead-in information, accessing a lead-in area of a next session on the basis of a starting time of a program area of the next session included in the Q subcode information and determining presence/absence of lead-in information in the next session; and when the lead-in information is present in the next session, retrieving the lead-in information from the next session, whereby readout of the lead-in information across adjoining ones of the sessions is sequentially performed up to a particular one of the sessions where the lead-in information is retrieved any longer or where the B0 pointer is retrieved any longer from the lead-in information.

10. A method of controlling recording on an optical disk after retrieval of disk information from said optical disk, said retrieval of disk information from said optical disk being performed by:

accessing a given location within an innermost lead-in area of a CD-R disk, to retrieve a starting time of the innermost lead-in area from ATIP information;

accessing a starting point of a PMA area of the disk, on the basis of the starting time of the innermost lead-in area, to retrieve PMA information;

on the basis of a time interval between adjoining tracks represented by the PMA information, dividing the tracks into a plurality of sessions and accessing a lead-in area of a last one of the sessions to determine presence/absence and validity of lead-in information in the last session;

when the lead-in information is present in the last session, determining whether a B0 pointer is present in Q subcode information of the lead-in information;

when the B0 pointer is present in the Q subcode information of the lead-in information, accessing a lead-in area of a next session on the basis of a starting time of a program area of the next session included in the Q subcode information and determining presence/absence of lead-in information in the next session; and when the lead-in information is present in the next session, retrieving the lead-in information from the next session, whereby readout of the lead-in information across adjoining ones of the sessions is sequentially performed up to a particular one of the sessions where the lead-in information is retrieved any longer or where the B0 pointer is retrieved any longer from the lead-in information, said method of controlling recording comprising the steps of:

when lead-in information is present in an outermost session of said optical disk, permitting additional writing of a next session on condition that a B0 pointer is included in Q subcode information of the lead-in information of the outermost session; and when there is no lead-in information in the outermost session, permitting additional writing of a further session next to the outermost session or recording, onto the outermost session, of lead-in and lead-out information to complete the outermost session.

11. A program code storage medium encoded with instructions which cause an optical disk recording apparatus to access a given location within an innermost lead-in area of a CD-R disk, to retrieve a starting time of the innermost lead-in area from ATIP information;

access a starting point of a PMA area of the disk, based on the starting time of the innermost lead-in area, to retrieve PMA information;

based on a time interval between adjoining tracks represented by the PMA information, divide the tracks into a plurality of sessions and to access a lead-in area of a last one of the sessions to determine presence/absence of lead-in information in the last session;

when the lead-in information is present in the last session, determine whether a B0 pointer is present in Q subcode information of the lead-in information;

when the B0 pointer is present in the Q subcode information of the lead-in information, access a lead-in area of a next session based on a starting time of a program area of the next session included in the Q subcode information and to determine presence/absence of lead-in information in the next session; and when the lead-in information is present in the next session, to retrieve the lead-in information from the next session, whereby readout of the lead-in information from the next session across adjoining ones of the sessions is sequentially performed up to a particular one of the sessions where the lead-in information from the next session is not retrieved any longer or where the B0 pointer is not retrieved any longer from the lead-in information from the next session.

12. A program code storage medium as claimed in claim 11, wherein the medium further includes instructions which cause the optical disk recording apparatus to control access to individual tracks of said CD-R disk based on the PMA information included in retrieved disk information or, for each session for which no PMA information is included in the disk information, based on the lead-in information in the last session.

13. A program code storage medium as claimed in claim 12, wherein the medium further includes instructions which cause the optical disk recording apparatus to:

when lead-in information is present in an outermost session of said optical disk, permit additional writing of a next session on condition that a B0 pointer is included in Q subcode information of the lead-in information of the outermost session; and when there is no lead-in information in the outermost session, permit additional writing of a further session next to the outermost session or recording, on to the outermost session, of lead-in and lead-out information to complete the outermost session.

14. An optical disk recording method, comprising:

identifying whether a type of an optical disk on which recording is to be made is a CD-RW disk or a CD-R disk;

if the type of the optical disk is the CD-RW disk, then accessing a given location within an innermost lead-in area of the CD-RW disk, to retrieve a starting time of the innermost lead-in area from ATIP information, accessing a starting point of a PMA area of the CD-RW disk, based on the starting time of the innermost lead-in area, to retrieve PMA information, based on a time interval between adjoining tracks represented by the PMA information, dividing the tracks into a plurality of sessions and accessing a lead-in area of a last one of the sessions to determine presence/absence and validity of lead-in information in the last session, and only when the lead-in information of the last session is judged to be valid, retrieving the lead-in information of the last session as valid lead-in information; and if the type of the optical disk is the CD-R disk, then accessing a given location within an innermost lead-in area of the CD-R disk, to retrieve a starting time of the innermost lead-in area of the CD-R disk from ATIP information of the CD-R disk, accessing a starting point of a PMA area of the CD-R disk, based on the starting time of the innermost lead-in area of the CD-R disk, to retrieve PMA information of the CD-R disk, based on a time interval between adjoining tracks represented by the PMA information of the CD-R disk, dividing the tracks into a plurality of sessions of the CD-R disk and accessing a lead-in area of a last one of the sessions of the CD-R disk to determine presence/absence of lead-in information in the last session of the CD-R disk, when the lead-in information is present in the last session of the CD-R disk, determining whether a B0 pointer is present in Q subcode information of the lead-in information of the CD-R disk, when the B0 pointer is present in the Q subcode information of the lead-in information of the CD-R disk, accessing a lead-in area of a next session of the CD-R disk based on a starting time of a program area of the next session of the CD-R disk included in the Q subcode information of the CD-R disk and determining presence/absence of lead-in information in the next session of the CD-R disk, and when the lead-in information is present in the next session of the CD-R disk, retrieving the lead-in information from the next session of the CD-R disk, whereby readout of the lead-in information from the next session of the CD-R disk across adjoining ones of the sessions of the CD-R disk is sequentially performed up to a particular one of the sessions of the CD-R disk where the lead-in information from the next session of the CD-R disk is not retrieved any longer or where the B0 pointer is not retrieved any longer from the lead-in information from the next session of the CD-R disk.

15. An optical disk recording apparatus, comprising:

a loading device to load an optical disk in an optical disk recording unit;

an identifying device to identify whether a type of the optical disk on which recording is to be made is a CD-RW disk or a CD-R disk; and a control section including a program code storage medium and machine-readable program code stored on the program code storage medium, the machine-readable program code having instructions to (a) if the type of the optical disk is the CD-RW disk, then access a given location within an innermost lead-in area of the CD-RW disk, to retrieve a starting time of the innermost lead-in area from ATIP information, access a starting point of a PMA area of the CD-RW disk, based on the starting time of the innermost lead-in area, to retrieve PMA information, based on a time interval between adjoining tracks represented by the PMA information, divide the tracks into a plurality of sessions and access a lead-in area of a last one of the sessions to determine presence/absence and validity of lead-in information in the last session, and only when the lead-in information of the last session is judged to be valid, retrieve the lead-in information of the last session as valid lead-in information, and (b) if the type of the optical disk is the CD-R disk, then access a given location within an innermost lead-in area of the CD-R disk, to retrieve a starting time of the lead-in area of the CD-R disk from ATIP information of the CD-R disk, access a starting point of a PMA area of the CD-R disk, based on the starting time of the innermost lead-in area of the CD-R disk, to retrieve PMA information of the CD-R disk, based on a time interval between adjoining tracks represented by the PMA information of the CD-R disk, divide the tracks into a plurality of sessions of the CD-R disk and access a lead-in area of a last one of the sessions of the CD-R disk to determine presence/absence of lead-in information in the last session of the CD-R disk, when the lead-in information is present in the last session of the CD-R disk, determine whether a B0 pointer is present in Q subcode information of the lead-in information of the CD-R disk, when the B0 pointer is present in the Q subcode information of the lead-in information of the CD-R disk, access a lead-in area of a next session of the CD-R disk based on a starting time of a program area of the next session of the CD-R disk included in the Q subcode information of the CD-R disk and determine presence/absence of lead-in information in the next session of the CD-R disk, and when the lead-in information is present in the next session of the CD-R disk, retrieve the lead-in information from the next session of the CD-R disk, whereby readout of the lead-in information from the next session of the CD-R disk across adjoining ones of the sessions of the CD-R disk is sequentially performed up to a particular one of the sessions of the CD-R disk where the lead-in information from the next session of the CD-R disk is not retrieved any longer or where the B0 pointer is not retrieved any longer from the lead-in information from the next session of the CD-R disk.

16. An optical disk recording apparatus, comprising:

a loading device to load an optical disk in an optical disk recording unit; and a control section including a program code storage medium and machine-readable program code stored on the program code storage medium, the machine-readable program code having instructions to access a given location within an innermost lead-in area of a CD-RW disk, to retrieve a starting time of the innermost lead-in area from ATIP information, access a starting point of a PMA area of the disk, based on the starting time of the innermost lead-in area, to retrieve PMA information, based on a time interval between adjoining tracks represented by the PMA information, divide the tracks into a plurality of sessions and to access a lead-in area of a last one of the sessions to determine presence/absence and validity of lead-in information in the last session, and only when the lead-in information of the last session is judged to be valid, retrieve the lead-in information of the last session as valid lead-in information.

17. An optical disk recording apparatus as claimed in claim 16, wherein the machine-readable program code of the control section further includes instructions to:

when the lead-in information of the last session is judged to be valid, permit additional writing of a next session on condition that a B0 pointer included in Q subcode information of the lead-in information of the last session is other than FF: FF: FF; and when there is no lead-in information in the last session or the lead-in information of the last session is judged to be invalid, permit additional writing of a track next to the last session or recording, on to the last session, of lead-in and lead-out information to complete the last session.

18. An optical disk recording apparatus, comprising:

a loading device to load an optical disk in an optical disk recording unit; and a control section including a program code storage medium and machine-readable program code stored on the program code storage medium, the machine-readable program code having instructions to access a given location within an innermost lead-in area of a CD-R disk, to retrieve a starting time of the innermost lead-in area from ATIP information, access a starting point of a PMA area of the disk, based on the starting time of the innermost lead-in area, to retrieve PMA information, based on a time interval between adjoining tracks represented by the PMA information, divide the tracks into a plurality of sessions and to access a lead-in area of a last one of the sessions to determine presence/absence of lead-in information in the last session, when the lead-in information is present in the last session, determine whether a B0 pointer is present in Q subcode information of the lead-in information, when the B0 pointer is present in the Q subcode information of the lead-in information, access a lead-in area of a next session based on a starting time of a program area of the next session included in the Q subcode information and to determine presence/absence of lead-in information in the next session, and when the lead-in information is present in the next session, to retrieve the lead-in information from the next session, whereby readout of the lead-in information from the next session across adjoining ones of the sessions is sequentially performed up to a particular one of the sessions where the lead-in information from the next session is not retrieved any longer or where the B0 pointer is not retrieved any longer from the lead-in information from the next session.

19. An optical disk recording apparatus as claimed in claim 18, wherein the machine-readable program code of the control section further includes instructions to control access to individual tracks of said CD-R disk based on the PMA information included in retrieved disk information or, for each session for which no PMA information is included in the disk information, based on the lead-in information in the last session.

20. An optical disk recording apparatus as claimed in claim 18, wherein the machine-readable program code of the control section further includes instructions to:

when lead-in information is present in an outermost session of said optical disk, permit additional writing of a next session on condition that a B0 pointer is included in Q subcode information of the lead-in information of the outermost session; and when there is no lead-in information in the outermost session, permit additional writing of a further session next to the outermost session or recording, on to the outermost session, of lead-in and lead-out information to complete the outermost session.

* * * * *